United States Patent Office 2,985,483
Patented May 23, 1961

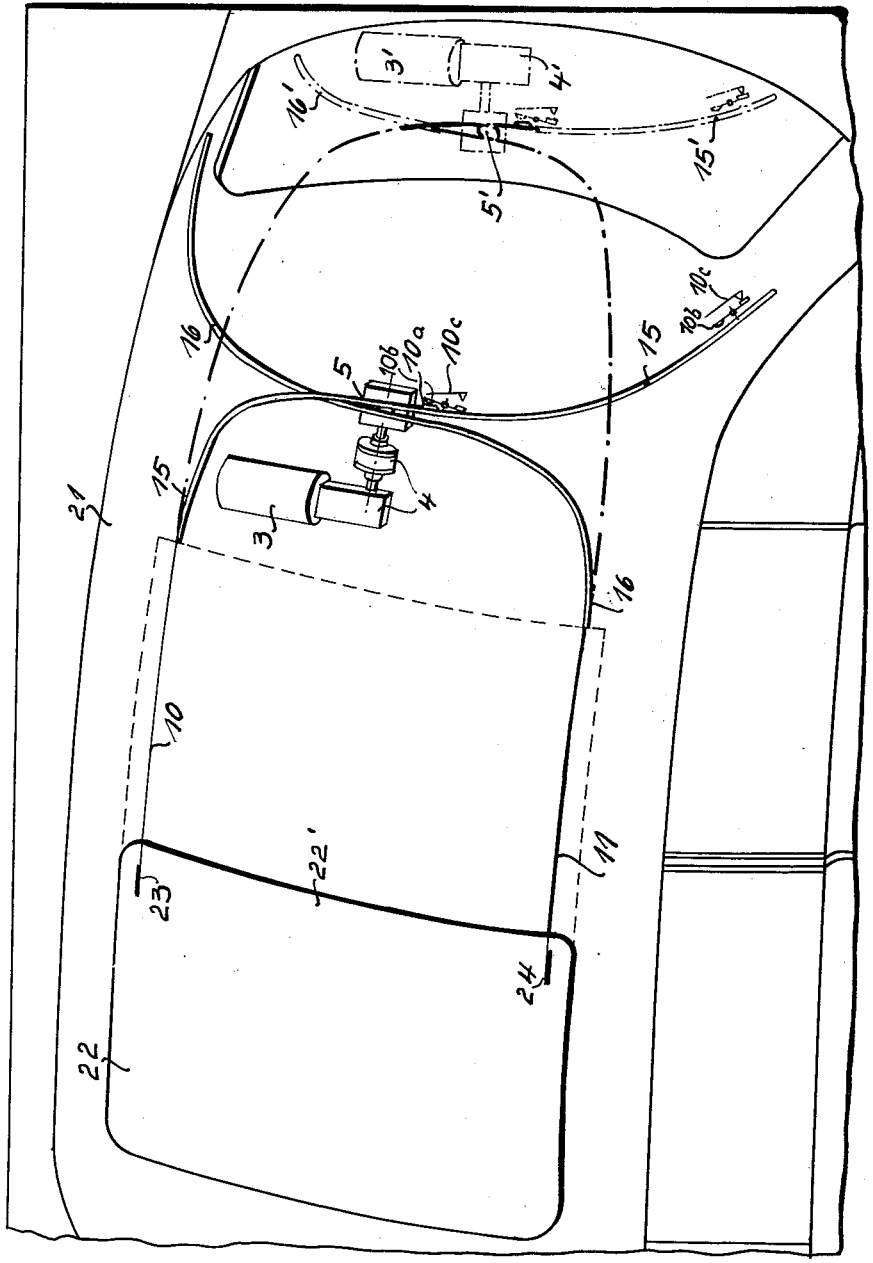

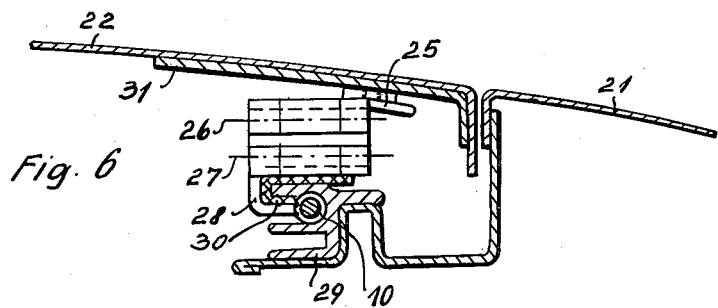
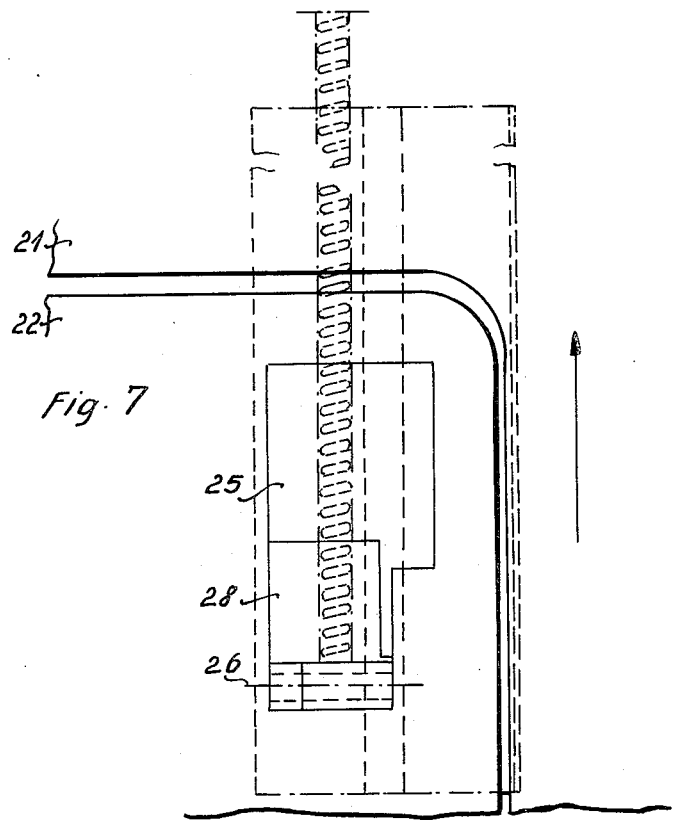

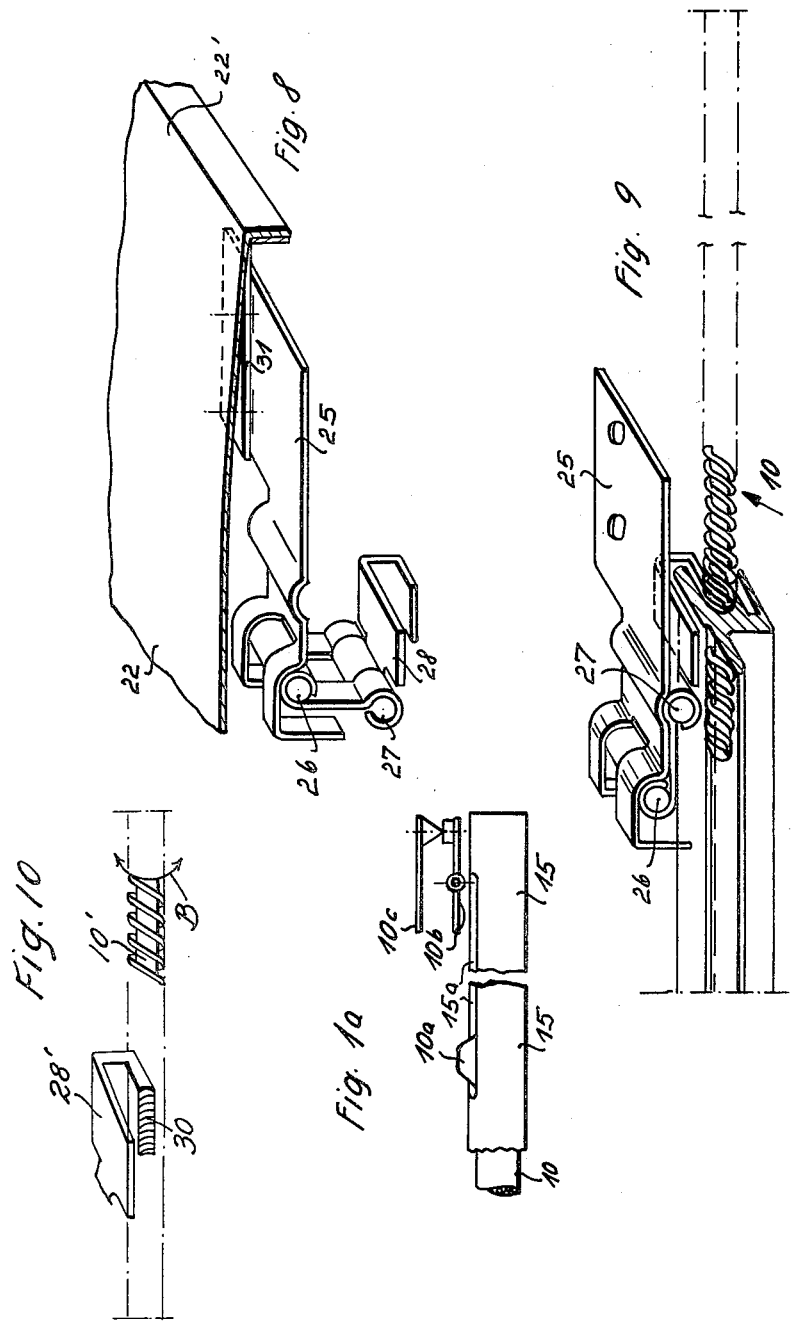

2,985,483
ELECTRICALLY OPERATED SLIDABLE CLOSURE

William Henry Bishop, 70 Croftdown Road, Harborne, Birmingham, England, and Hans Golde, Hanauer Landstrasse 338, Frankfurt, Germany Filed Oct. 2, 1957, Ser. No. 687,760

Claims priority, application Germany May 14, 1957

3 Claims. (Cl. 296—105)

This invention relates to electrically operated slidable closures for vehicles and more particularly to a special type of driving means.

The invention provides a novel driving means suitable for all kinds of slidable closures such as rigid slidable closures and foldable closures and for other movable parts of a vehicle roof.

A disadvantage of previously known driving means for slidable closures is that a large number of transmitting means was necessary. Therefore, these systems were comparatively susceptible to obstruction and did not operate as noiselessly as desirable.

In accordance with the invention the disadvantages of the previously known systems can be avoided, for example, by the provision of a device with an electric motor mounted on a stationary part of the vehicle, a suitable transmission driven by said motor and comprising a worm transmission driven by said motor and comprising a worm gear, a flexible worm cable meshing with said worm gear and operatively connected with the movable part of the roof. Such a driving means for a slidable closure according to the invention is extremely reliable and essentially noiseless in operation. Preferably the electric motor is placed in the vehicle such that the occupants will not be bothered by any noise issuing from the motor.

The details of the driving means according to the invention may be different. Basically, there are at least two possibilities for the construction. The worm cable may either be rigidly secured to the movable closure, said cable thus being displaced together with the slidable closure, or the cable may be rotatably, though not axially, movable with regard to a stationary top frame or the like, bearing at the same time a fastening device rigidly secured to the movable closure, said movable closure and said fastening device being movable together with regard to said cable.

A switch may be provided for terminating the closing and the opening movement. Instead of two stitches a single cutout for interrupting the drive may preferably be provided. Additionally, a switch may be provided for locking the movable closure in any desired position.

In a device according to the invention, a single worm cable may be provided centrally or laterally. Preferably, however, a worm cable is provided at both sides of the roof with both cables being operable by a common drive.

Two embodiments of the invention, both using cables rigidly secured to the movable closure, will be more fully described in conjunction with the accompanying drawing. As mentioned above, the invention is not restricted to such embodiments since, for example, instead of the cable being secured to the slidable closure, a nut or like fastening device movable along the cable longitudinally may be rigidly secured to the closure.

In the drawing:

Fig. 1a is an enlarged view of a detail of Fig. 1;

Fig. 5 is a view similar to that illustrated in Fig. 1 showing a second embodiment of the invention with a rigid slidable closure;

Fig. 6 is an enlarged vertical sectional view of the right side of the guide gear for the top shown in Fig. 5 together with a driving cable;

Fig. 7 is a top view of the guide bar illustrated in Fig. 6;

Fig. 8 is a perspective view of a guide member secured to the slidable top in the forward end position of said top;

Fig. 9 is a partial view of a worm connected with the guide member illustrated in Fig. 8 and of the guide bar in an intermediate position of the slidable top; and Fig. 10 is a partial view of another embodiment of a guide member for use in connection with a rotatable worm.

Figure 1:
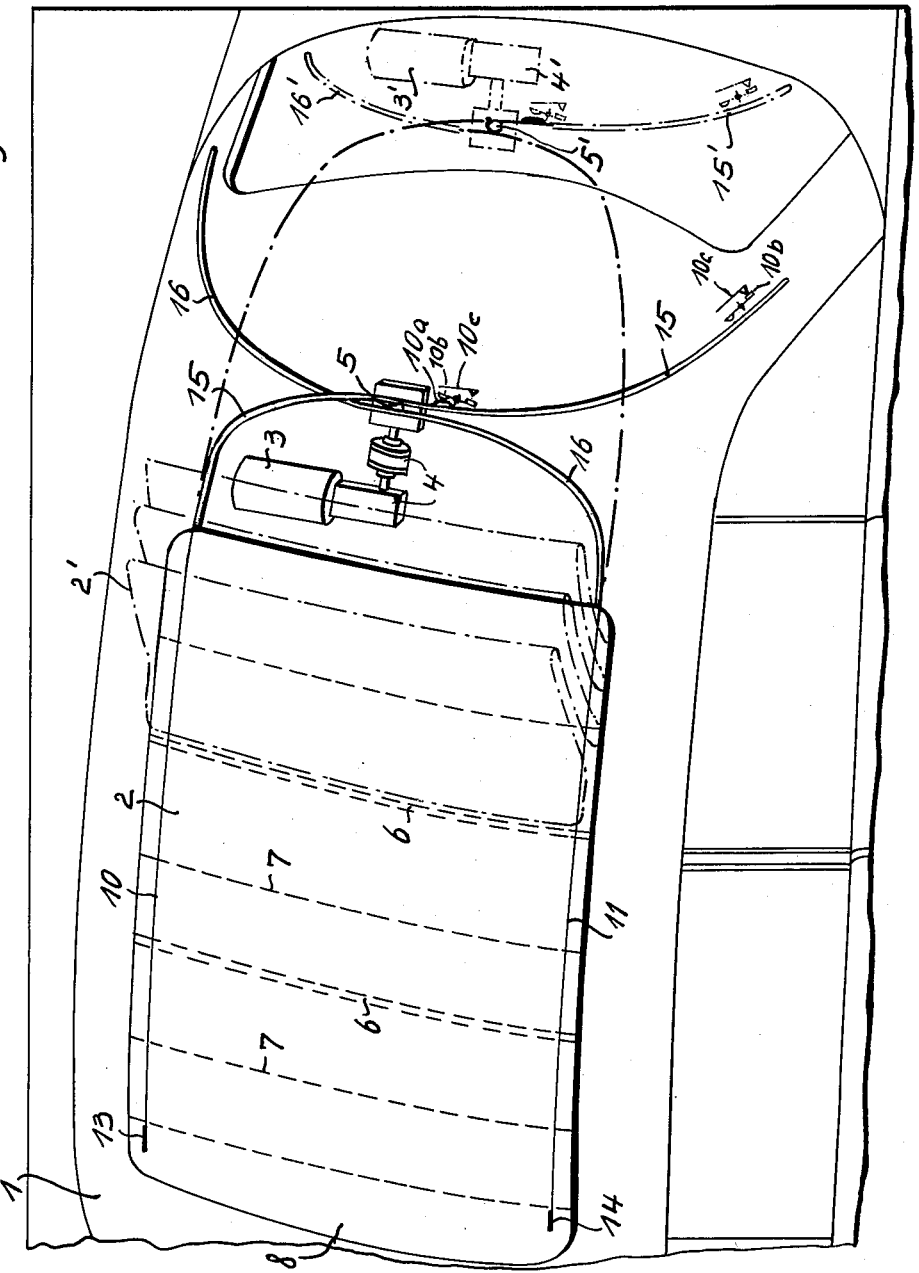
Fig. 1 is a schematic perspective top view of a part of a motor vehicle with a slidable closure in the form of a foldable top with driving means provided in accordance with the invention.

According to the first embodiment of the invention, Figs. 1 to 4 show a motor vehicle with a roof 1 in which roof a foldable closure 2 has been installed. The foldable closure 2 is shown in its closed position, the open position, however, being indicated by dash-and-dot lines 2'.

Rearward of the slidable closure 2, an electric motor 3 is mounted on a stationary part 1 of the roof, the electric motor 3 operating by means of a driving transmission 4 a worm gear indicated in the drawing by a casing 5.

The foldable closure 2 has a front brace 6 and intermediate braces 7 as well as a front closing flap 8, which overlies the front edge of the roof opening in the fully closed position of the foldable closure.

At both sides of the roof opening, guide bars 9 (Fig. 2) for the foldable closure 2 are mounted on the stationary part 1 of the roof. Each of these bars 9 contains a longitudinal bore as a guide for worm cables 10 and 11, respectively which are flexible cables with helical ribs 12.

Both cables 10 and 11 have their front ends rigidly secured to the front closing flap 8 of the foldable closure by means of connecting pieces 13 and 14 made of sheet metal. These connecting pieces, diagrammatically indicated in Fig. 1, are more clearly shown in Figs. 2 to 4. Each connecting piece or bracket 13 and 14 consists of a rectangular piece of sheet metal shaped with two angles in cross section, this bracket being welded to the cable 10 along a longitudinal ridge 13' and to the closing flap 8 along the other longitudinal ridge 13'' or being rigidly secured to the cable and to the flap in any other suitable manner. The rear ends of the cables 10 and 11 extend on opposite sides beyond the worm gear casing 5 and are in constant engagement with said worm gear.

The motor 3 may be started by means of a switch mounted at the vehicle's instrument panel (not shown). The motor rotates the worm wheel 5 and, with the worm wheel rotating, the cables 10 and 11 are displaced. The direction of rotation is reversible, depending on whether the slidable closure is to be opened or closed. In the closed position of the roof according to Fig. 1, the rear ends of the cables 10 and 11 are situated near the worm wheel and are subsequently moved backward and outward on rotation of the worm wheel. In moving backward the front ends of the cables by means of the connecting pieces 13 and 14 retract the front part 8 of the roof and with it the entire foldable closure 2 rearward into the folded, open position 2'.

As an additional guide for each cable 10 and 11 following the bore in the guide bar 9, guiding tubes 15 and 16 are provided, and these tubes 15 and 16, preferably made of synthetic products, such as plastic and the like, are mounted on the stationary part 1 of the roof.

Figure 2:
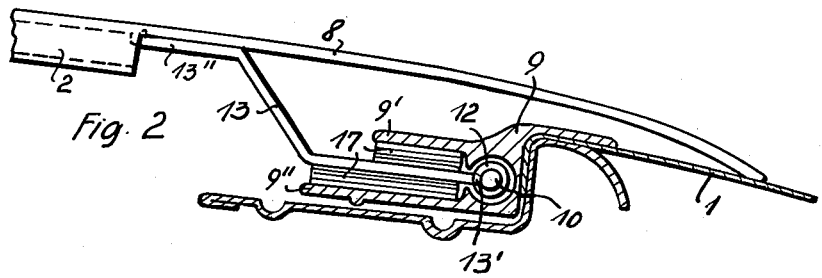
Fig. 2 is an enlarged vertical sectional view of the right side of a guide for the foldable top together with a driving cable.
Figure 4A:
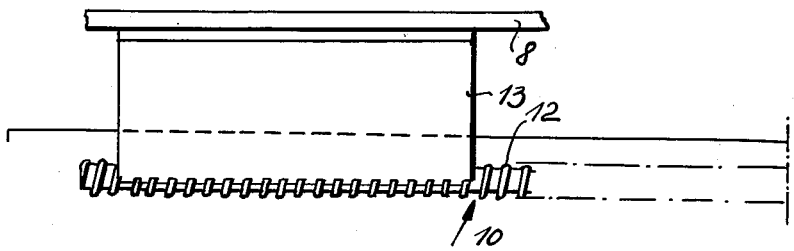
Figs. 4a and 4b are side views of the guide illustrated in Figs. 2 and 3.
Figure 4B:
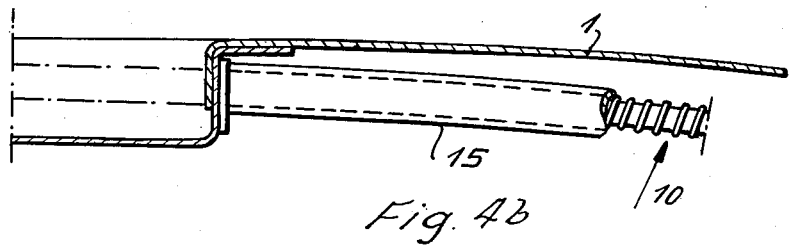
Figure 3:
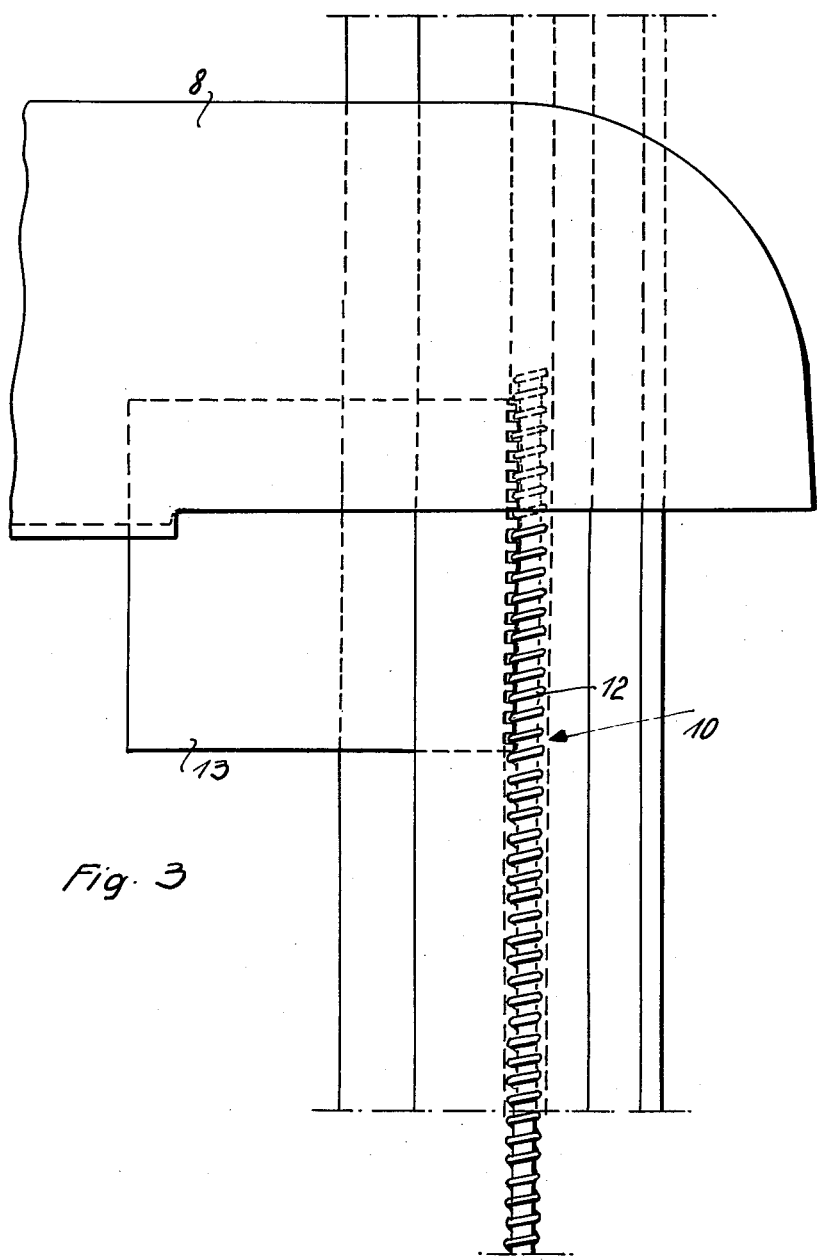
Fig. 3 is a top view of the guide illustrated in Fig. 2.

In Fig. 2, the guide for the bracket 13 rigidly connecting the cable 10 and the foldable closure 2, is shown in the form of a channel lined with felt, which channel is formed by two parallel flanges 9' and 9" of the guide bar 9.

The foldable closure 2 may be stopped in any desired intermediate position by a switch operable at will. Correspondingly, stopping of the closure in the front and rear end position may be effected by suitable cutout switches 10b, 10c actuated by a cam 10a on the cable 10, a slot 15a being provided in the guide tube 15 for accommodating said cam. Instead of these means, however, an overload cutout may be provided for automatically stopping the drive of the slidable closure when one of the end positions is reached by such closure.

The second embodiment of the invention according to Figs. 5 to 9 is concerned with a motor vehicle with a rigid slidable closure. The roof 21 of the vehicle is provided with a slidable top 22 made of steel. This modification also includes an electric motor 3 with a transmission 4 comprising a worm gear 5, cooperating with two flexible worm cables 10 and 11. The guide tubes 15 and 16 correspond to those of the first embodiment.

The front ends of the cables have connections 23 and 24 to the slidable closure 22. These connections are provided with joint links in order to allow a vertical movement of the top 22 with regard to the stationary roof 21. This is necessary, since, in being opened, the slidable top 22 must first be lowered and then moved backward beneath the roof 21.

In the second embodiment as well as in the first one, each of the cables 10 and 11 is displaced together with the slidable closure 22 when the closure is opened or closed. The connection between the cables 10 and 11 and the slidable closure 22, however, is formed with special joints (see Figs. 8 and 9).

A connecting piece 25 of sheet metal, screwed or welded to the slidable closure 22 or rigidly secured to it in some other manner, is provided with two pivots by axles 26 and 27 and with a bracket 28 rigidly secured to the worm cable 10. As shown in Fig. 6 in cross-section, the bracket 28 is rigidly secured to the worm cable 10 by means of spot welds.

The bracket 28 is mounted for slidable movement along the stationary guide bar 29, the upper flange of which is covered by a strip of felt 30. In order to avoid any damage of the slidable top 22 in securing the bracket 25, an angle piece 31 of sheet metal is inserted, which angle piece is attached to the side flange of the top 22 solely and is directly secured to the connecting piece 25.

The operation of the driving means according to the second embodiment as shown in Figs. 5 to 9 is similar to that of the first embodiment. When the worm gear 5 is rotated by the driving motor 3, the cables 10 and 11 are moved axially (arrow A) in opposite directions and the slidable steel closure 22 is displaced together with these cables. Starting and stopping of the driving means may be performed in any suitable manner as described for the first embodiment of the invention with respect to the end positions as well as for the intermediate positions of the slidable top 22.

A particular feature of the embodiment with the rigid slidable top includes the articulation pieces 25 to 28 slidable with the slidable roof 22 and mounted near the rearward edge of the movable top 22. These pieces raise the rearward edge 22' by an additional forward displacement of the axle 27 by the cable 10 without correspondingly moving the slidable top 22 when the top has reached its front end position. The axle 26, which is pivotal about and spaced longitudinally and vertically from the axle 27, is thereby moved from the position shown in Fig. 9 into a position essentially vertically above the axle 27, as shown in Fig. 8, at the same time lifting the rearward edge 22' of the top plate into the closed position; i.e., the position with the slidable top 22 at equal level with the stationary roof 21.

As already mentioned, the electric motor 3 for moving the slidable closure may be installed at any suitable place. In Figs. 1 and 5, the motor is shown at the end of the frame of the roof, beneath the sheet metal of the roof, but another example of the position of the motor is indicated by dash-and-dot lines, showing the motor 3' with the gear 4' arranged in the vehicle trunk behind the passenger compartment. The gear 4', the worm gear 5' and the guide tubes 15', 16' for the cable are likewise indicated by dash-and-dot lines. The motor together with its gear may be placed in any other part of the car as desired.

Though both of the embodiments described refer to driving means with the cables 10 and 11 moving forward and backward together with the slidable closure, the cables may as well be mounted for rotatable movement instead of axial movement, thereby causing longitudinal movement of some member rigidly connected to the slidable closure without departing from the scope of the invention; such a rigidly connected member may be, for example, a nut rigidly connected with the slidable top and sliding longitudinally on the cable, when the cable is rotating.

Fig. 10 illustrates a bracket connected to the slidable closure 22 by means of a connecting piece 25, as shown in Fig. 8. The bracket 28' according to Fig. 10 has its lower edge provided with an internal thread 30 meshing with a worm 10', said worm being rotatably supported by guide bars 9 and agitated for rotatable movement by a worm gear such as gear 5 shown in Fig. 5. Therefore, rotation (arrow B) of said worm will cause an axial movement of the bracket 28' and via connecting piece 25 the slidable closure 22 will be moved in one direction or the other, depending on the direction of rotation of worm 10'.

What we claim is:

1. Apparatus for operating a slidable closure for a vehicle roof having an opening therein with a stop against which the closure abuts, said apparatus comprising guide rails along said opening, worm cables in said guide rails, a motor on said vehicle, a worm gear driven by said motor and operatively engaging said cables to operate the same, and means coupling said closure to said cables whereby the closure is displaced relative to said opening, said means comprising brackets adapted for movement along said rails, a first pivot on each of said brackets and transverse to said rails, a second pivot parallel to but spaced from said first pivot and hinged about the same, and a member pivoted on said second pivot and connected to said closure; the closure, connecting members and second pivots being pivoted about the first pivots to raise said closure in response to the abutting of said stop by said closure.

2. Apparatus as claimed in claim 1, wherein said cables are displaceable and wherein said brackets are affixed to said cables for movement therewith.

3. Apparatus as claimed in claim 1, wherein said brackets are displaceable along and relative to said cables.

References Cited in the file of this patent

UNITED STATES PATENTS

| | | |
|---|---|---|
| 2,067,815 | Barber et al. | Jan. 12, 1937 |
| 2,072,468 | Saur | Mar. 2, 1937 |
| 2,338,225 | Ball | Jan. 4, 1944 |
| 2,496,785 | Finneburgh | Feb. 7, 1950 |
| 2,558,926 | Bramble | July 3, 1951 |
| 2,821,092 | Cordora | Jan. 28, 1958 |

FOREIGN PATENTS

| | | |
|---|---|---|
| 683,477 | Great Britain | Nov. 26, 1952 |
| 447,622 | Italy | Apr. 23, 1949 |